US008345732B2

(12) United States Patent
Fischer et al.

(10) Patent No.: US 8,345,732 B2
(45) Date of Patent: Jan. 1, 2013

(54) FEEDBACK OF CHANNEL INFORMATION IN A CLOSED LOOP BEAMFORMING WIRELESS COMMUNICATION SYSTEM

(75) Inventors: Matthew James Fischer, Mountain View, CA (US); Joonsuk Kim, San Jose, CA (US); Christopher J. Hansen, Sunnyvale, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 1373 days.

(21) Appl. No.: 11/412,388

(22) Filed: Apr. 27, 2006

(65) Prior Publication Data

US 2006/0291544 A1   Dec. 28, 2006

Related U.S. Application Data

(63) Continuation-in-part of application No. 11/168,793, filed on Jun. 28, 2005.

(60) Provisional application No. 60/698,686, filed on Jul. 13, 2005, provisional application No. 60/730,718, filed on Oct. 27, 2005, provisional application No. 60/742,963, filed on Dec. 7, 2005.

(51) Int. Cl.
*H04L 5/16* (2006.01)

(52) U.S. Cl. .......................................... 375/219; 375/267

(58) Field of Classification Search .................. 375/219, 375/267
See application file for complete search history.

(56) References Cited

U.S. PATENT DOCUMENTS

| 7,068,981 | B2 * | 6/2006 | Sim ................................. 455/101 |
| 7,809,996 | B2 * | 10/2010 | Cioffi ............................. 714/704 |
| 7,839,819 | B2 * | 11/2010 | Kim ................................. 370/329 |
| 8,077,669 | B2 * | 12/2011 | Kim ................................. 370/329 |
| 2005/0152473 | A1 * | 7/2005 | Maltsev et al. ................ 375/299 |
| 2006/0274702 | A1 * | 12/2006 | Li et al. ........................... 370/338 |

* cited by examiner

*Primary Examiner* — Shuwang Liu
*Assistant Examiner* — Michael Neff
(74) *Attorney, Agent, or Firm* — Garlick & Markison

(57) ABSTRACT

A method for feeding back transmitter beamforming information from a receiving wireless communication device to a transmitting wireless communication device includes a receiving wireless communication device receiving a preamble sequence from the transmitting wireless device. The receiving wireless device estimates a channel response based upon the preamble sequence and then determines an estimated transmitter beamforming unitary matrix based upon the channel response and a receiver beamforming unitary matrix. The receiving wireless device then decomposes the estimated transmitter beamforming unitary matrix to produce the transmitter beamforming information and then wirelessly sends the transmitter beamforming information to the transmitting wireless device.

20 Claims, 11 Drawing Sheets

| 1 | 1 | 3 | 1 | 2 | 1 | 16 |
|---|---|---|---|---|---|---|
| element ID = xxx | length (var) | OUI | type | HT capabilities info | MAC HT parameters info | supported MCS set | required number of octets

| | stronger | HF FB | HVFC FBA | TXCXABL | ITTXBF | ETTXBF |
|---|---|---|---|---|---|---|
| RXBF sounding | | | | | | |

| 1 | 1 | 3 | 1 | 2 | 1 | 16 |
|---|---|---|---|---|---|---|
| element ID = xxx | length (var) | OUI | type | HT capabilities info | MAC HT parameters info | supported MCS set | required number of octets

| ETXBF | reserved |
|---|---|
| bit 0 | bits 1-7 | bits 0-7 = 1

FIG. 12

FEEDBACK OF CHANNEL INFORMATION IN A CLOSED LOOP BEAMFORMING WIRELESS COMMUNICATION SYSTEM

CROSS REFERENCES TO RELATED APPLICATIONS

This application is a continuation-in-part of U.S. Utility application Ser. No. 11/168,793, filed Jun. 28, 2005 and claims priority to U.S. Provisional Patent Application Ser. No. 60/698,686, filed Jul. 13, 2005, and claims priority to U.S. Provisional Patent Application Ser. No. 60/730,718, filed Oct. 27, 2005, and claims priority to U.S. Provisional Patent Application Ser. No. 60/742,963, filed Dec. 7, 2005, all of which are incorporated herein by reference for all purposes.

BACKGROUND OF THE INVENTION

1. Technical Field of the Invention

This invention relates generally to wireless communication systems and more particularly to wireless communications using beamforming.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Wireless communication devices include a built-in radio transceiver (i.e., receiver and transmitter) or include a processor that is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. Prior art papers (1) Digital beamforming basics (antennas) by Steyskal, Hans, Journal of Electronic Defense, Jul. 1, 1996; (2) Utilizing Digital Down converters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003 discuss beamforming concepts.

In order for a transmitter to properly implement beamforming (i.e., determine the beamforming matrix [V]), it needs to know properties of the channel over which the wireless communication is conveyed. Accordingly, the receiver must provide feedback information for the transmitter to determine the properties of the channel. One approach for sending feedback from the receiver to the transmitter is for the receiver to determine the channel response (H) and to provide it as the feedback information. An issue with this approach is the size of the feedback packet, which may be so large that, during the time it takes to send it to the transmitter, the response of the channel has changed.

Thus, there is a significant interest in transmit beamforming. Generally, the feedback packets may utilize implicit feedback (reciprocity based) in which the transmitter determined receive channel characteristics are assumed, by the transmitter, to be the same as the transmit channel characteristics or conditions. Such channel characteristics include the various types of signal and path interference that distort or block or create multipath components. While some believe that implicit feedback is adequate, others believe that specific applications require explicit feedback wherein a receiver actually provides the feedback packets discussed above to enable the transmitter to adjust the forward link in an appropriate manner. One problem with providing explicit feedback, however, is that current communication protocols provide little room for the feedback signaling. A need exists therefore, for a communication protocol that provides explicit beam forming using existing interface definitions and, alternately, that provides new interface definitions for supporting explicit transmit beam forming feedback.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
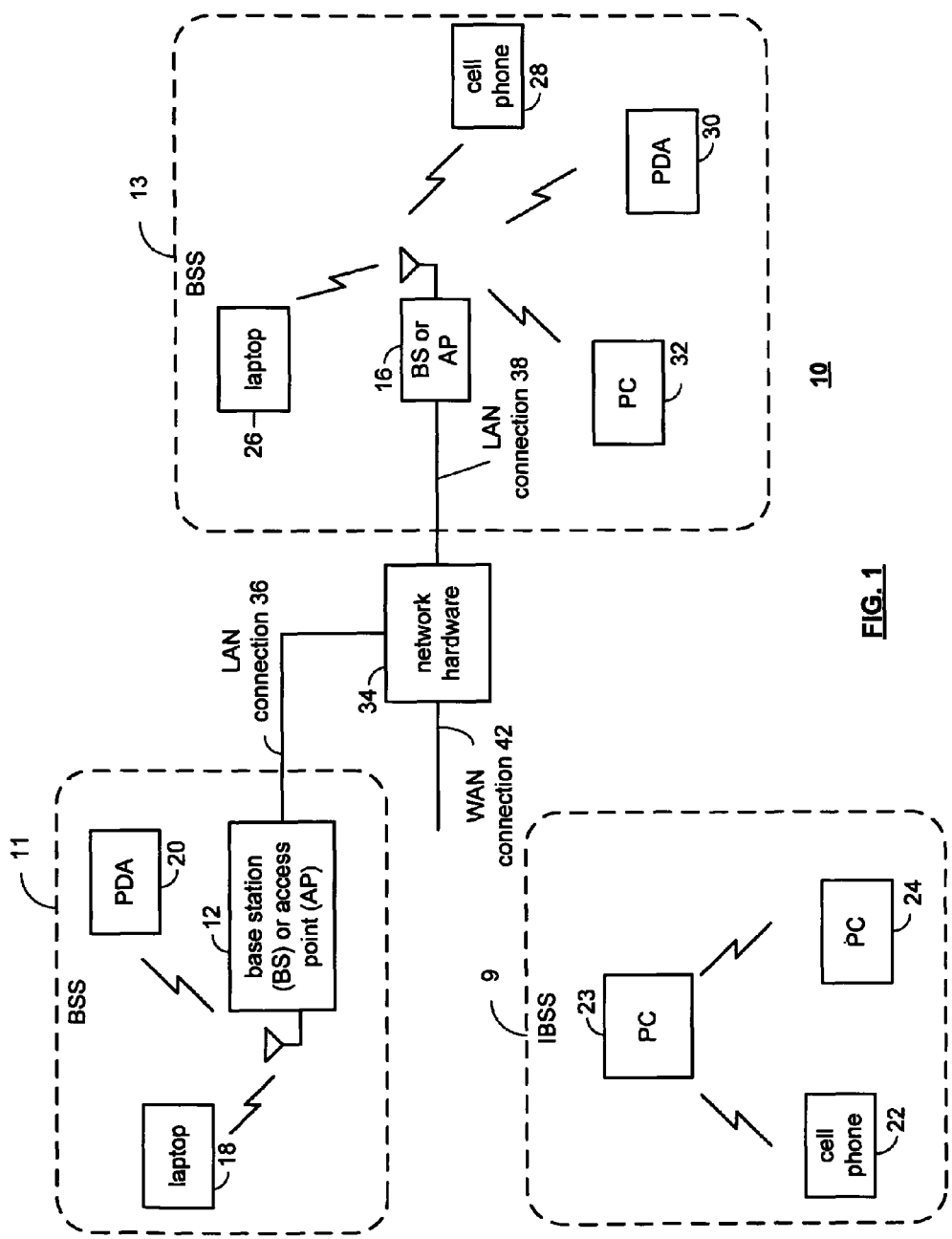
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, etc., provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12, 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
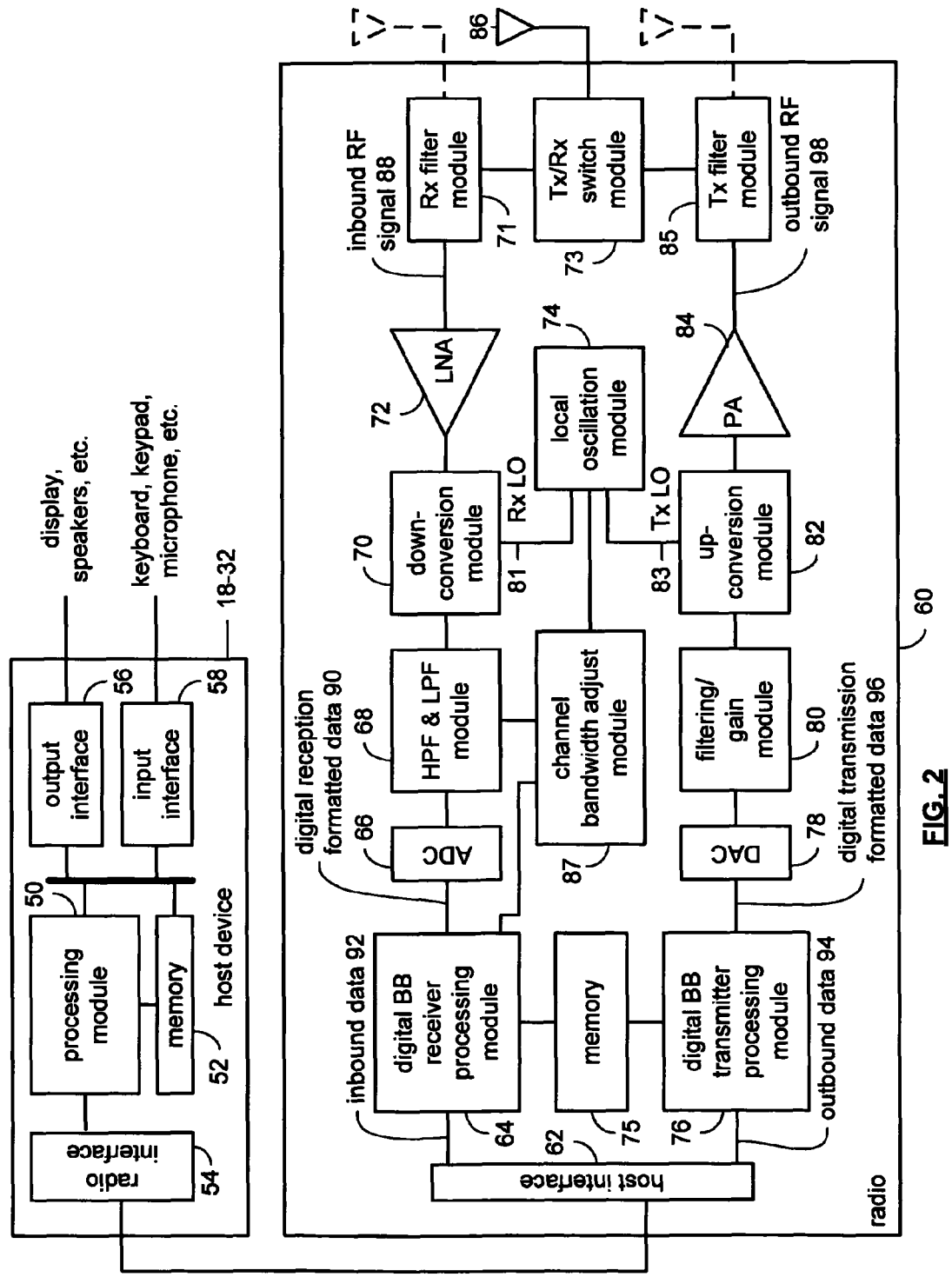
FIG. 2 is a schematic block diagram illustrating an embodiment of a wireless communication device in accordance with the present invention.

FIG. 2 is a schematic block diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce digital transmission formatted data 96. The digital transmission formatted data 96 will be digital base-band signals (e.g., have a zero IF) or a digital low IF signals, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the digital reception formatted data to produce filtered inbound signals.

The analog-to-digital converter 66 converts the filtered inbound signals from the analog domain to the digital domain to produce digital reception formatted data 90, where the digital reception formatted data 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
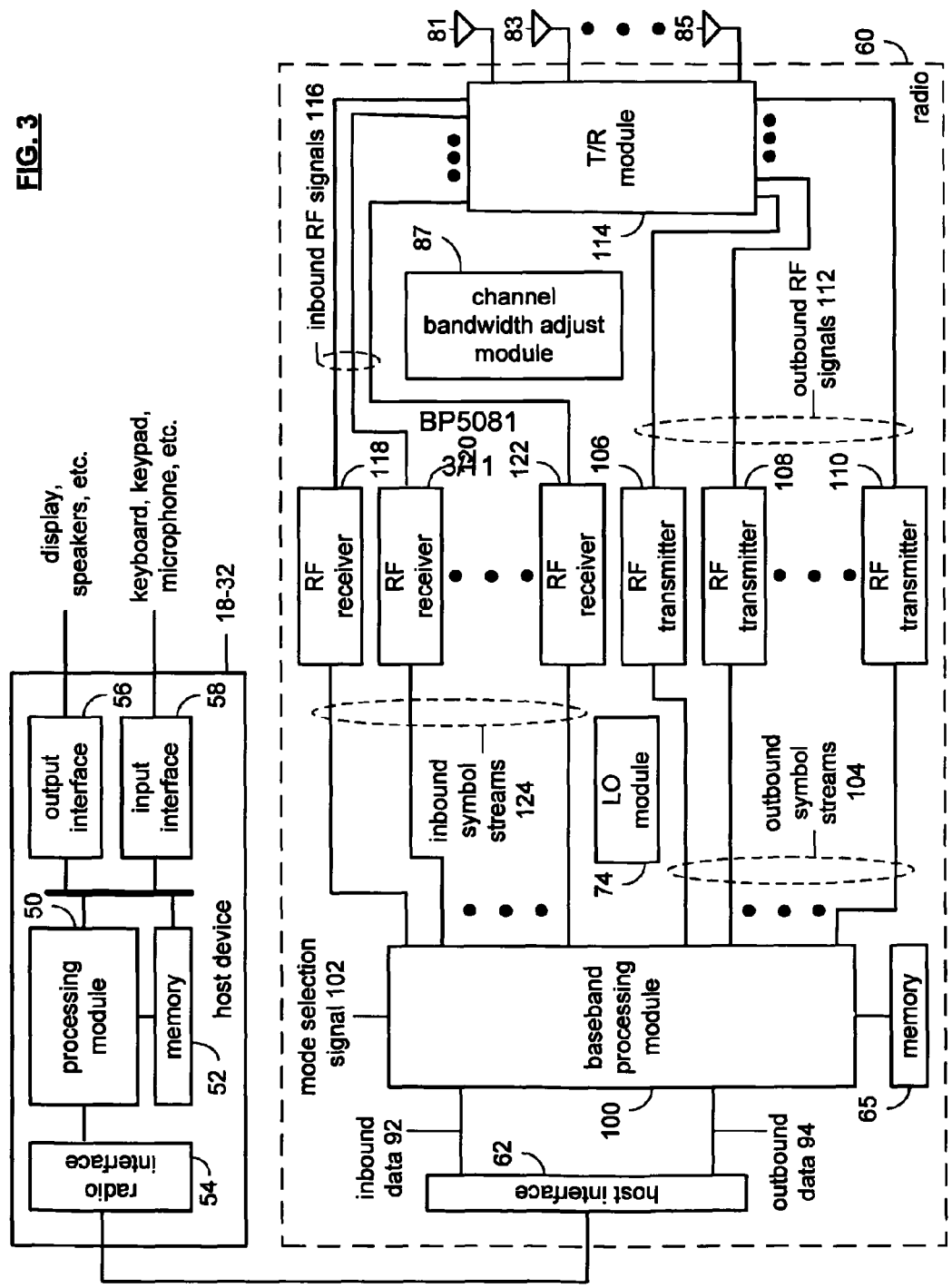
FIG. 3 is a schematic block diagram illustrating another embodiment of another wireless communication device in accordance with the present invention.

FIG. 3 is a schematic block diagram illustrating another embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, encoding, scrambling, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to up convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, down converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
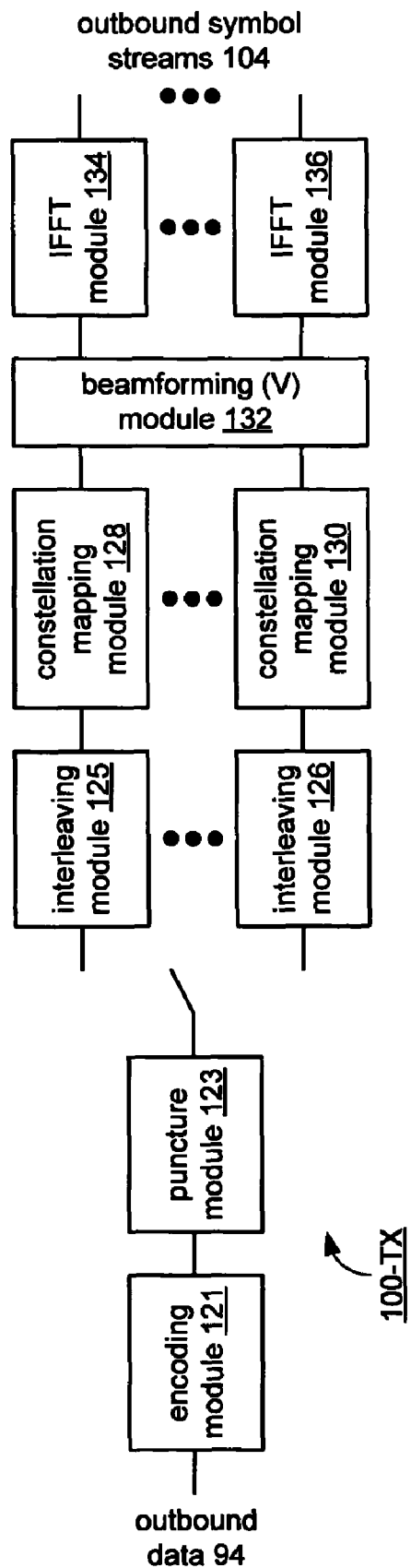
FIG. 4 is a schematic block diagram of baseband transmit processing in accordance with the present invention.

FIG. 4 is a schematic block diagram of baseband processing module 100 (100-TX) circuit block within the baseband processing module 100, which includes an encoding module 121, a puncture module 123, a switch, a plurality of interleaving modules 125, 126, a plurality of constellation encoding modules 128, 130, a beamforming module (V) 132, and a plurality of inverse fast Fourier transform (IFFT) modules 134, 136 for converting the outbound data 94 into the outbound symbol stream(s) 104. As one of ordinary skill in the art will appreciate, the baseband transmit processing may include two or more of each of the interleaving modules 125, 126, the constellation mapping modules 128, 130, and the IFFT modules 134, 136. In addition, one of ordinary skill in art will further appreciate that the encoding module 121, puncture module 123, the interleaving modules 124, 126, the constellation mapping modules 128, 130, and the IFFT modules 134, 136 may function in accordance with one or more wireless communication standards including, but not limited to, IEEE 802.11a, b, g, n.

In one embodiment, the encoding module 121 is coupled to receive outbound data 94 and is operable to convert data 94 into encoded data in accordance with one or more wireless communication standards. The puncture module 123 is coupled to receive the encoded data and is operable to puncture the encoded data to produce punctured encoded data. The plurality of interleaving modules 125, 126 is operably coupled to interleave the punctured encoded data into a plurality of interleaved streams of data. The plurality of constellation mapping modules 128, 130 is operably coupled to map the plurality of interleaved streams of data into a plurality of streams of data symbols. The beamforming module 132 is operably coupled to beamform, using a unitary matrix having polar coordinates in the described embodiment, the plurality of streams of data symbols into a plurality of streams of beamformed symbols. The plurality of IFFT modules 134, 136 is operably coupled to convert the plurality of streams of beamformed symbols into a plurality of outbound symbol streams.

As discussed before, there are multiple approaches that may be pursued for providing a system that utilizes either implicit or explicit feedback describing channel characteristics. In the described embodiment, support is provided for both feedback approaches. To provide such support, the embodiments of the invention provide signaling of beamforming capabilities and frame formats for feedback in addition to frame formats for channel sounding.

Generally, the receiving station provides, on a MIMO channel, a feedback signal comprising a matrix for each subcarrier wherein the matrix defines a channel response for each transmit and receive antenna. For example, if the receiving station has two transmit and two receive antennas, a 2×2 matrix is transmitted for each subcarrier. In one embodiment of the invention, a defined frame is operable to support implicit and explicit feedback in which the matrices are transmitted. Thus, a receiver is operable to receive a preamble with one or more long training sequences to compute the channel conditions and to generate the corresponding matrix (matrices) for transmission to the transmitter. The transmitter then utilizes the received matrix (matrices) to adjust the forward link transmit modulation and/or power levels. In the described embodiment, a sounding frame including a long training sequence is transmitted for each antenna. A feedback matrix is then generated by the receiver and is received by the transmitter for each antenna and/or long training sequence. Thus, the various embodiments of the invention including the system of FIG. 4 are operable to support explicit and implicit feedback as described.

The explicit feedback approach includes generating the feedback frames for calibration of the forward link in one of a plurality of formats. In a first format, a full matrix is generated and transmitted by the receiver in which all feedback information is generated. In an alternate approach, a reduced channel feedback frame may be utilized using any one of a plurality of methods for reducing the feedback information. In yet another alternate approach, rate and/or power or other forward link parameters are specified by the receiver in accordance with receiver detected channel conditions.

With respect to the embodiment that utilizes a reduced feedback information matrix, in one embodiment, the beamforming module 132 is operably coupled to multiply a beamforming unitary matrix (V) with baseband signals provided by the plurality of constellation mapping modules 128, 130. The beamforming module 132 determines the beamforming unitary matrix V from feedback information from the receiver, wherein the feedback information includes a calculated expression of the beamforming matrix V having polar coordinates. The beamforming module 132 generates the beamforming unitary matrix V to satisfy the conditions of "V*V=VV*="I", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, V*V means "conjugate (V) times V" and VV* means "V times conjugate (V)". Note that V may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column of V, a first row of polar coordinates including real values as references and a second row of polar coordinates including phase shift values.

In one embodiment, the constellation mapping modules 128, 130 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For instance, a 16 QAM (Quadrature Amplitude Modulation) includes 16 constellation points, each corresponding to a different symbol. For an OFDM signal, the beamforming module 132 may regenerate the beamforming unitary matrix V for each tone from each constellation mapping module 128, 130, use the same beamforming unitary matrix for each tone from each constellation mapping module 128, 130, or a combination thereof.

The beamforming unitary matrix varies depending on the number of transmit paths (i.e., transmit antennas—M) and the number of receive paths (i.e., receiver antennas—N) for an M×N MIMO communication. For instance, for a 2×2 MIMO communication, the beamforming unitary matrix may be:

$$V = (V)ij = \begin{bmatrix} \cos\psi_1 & \cos\psi_2 \\ \sin\psi_1 e^{j\phi_1} & \sin\psi_2 e^{j\phi_2} \end{bmatrix}$$

In order to satisfy V*V=I, it needs to satisfy followings.

$$\cos\psi_1 \cos\psi_2 + \sin\psi_1 \sin\psi_2 e^{j(\Phi_2-\Phi_2)} = 0$$

$$\cos\psi_1 \cos\psi_2 + \sin\psi_1 \sin\psi_2 e^{j(\Phi_2-\Phi_2)} = 0$$

Where i, j=1, 2; $\psi_1$, $\Phi_1$, $\psi_2$, and $\Phi_2$ represent angles of the unit circle, wherein absolute value of $\psi_1-\psi_2=\pi/2$ and $\Phi_1=\Phi_2$ or $\Phi_1=\Phi_2+\pi$ and $\psi_1+\psi_2=\pi/2$.

Therefore, with $\Phi_1$ and $\psi_1$, the beamforming module 132 may regenerate V per each tone. For example, With 4-bits expression for angle $\Phi_1$ and 3-bits for angle $\psi_1$, and 1-bit for the index for #1 or #2 in 54 tones, (i.e., 8-bits per tone) total feedback information may be 8×54/8=54 bytes. ($\psi$ in [0, $\pi$], $\Phi$ in [$-\pi$, $\pi$]).

For a 3×3 MIMO communication, the beamforming unitary matrix may be:

$$V = (V)ij = \begin{bmatrix} \cos\psi_1 & \cos\psi_2 & \cos\psi_3 \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} \end{bmatrix}$$

where i, j=1, 2, 3; $\psi_1$, $\psi_2$, $\psi_3$, $\theta_1$, $\theta_2$, $\theta_3$, $\Phi_{21}$, $\Phi_{22}$, $\Phi_{23}$, $\Phi_{31}$, $\Phi_{32}$, $\Phi_{33}$, represent angles of the unit circle, wherein Diagonal (V*V)=1s, and wherein:

$$\psi_1 = \cos^{-1} V_{1i}, \quad \theta_i = \cos^{-1}\left|\frac{V_{2i}}{\sin\psi_i}\right|$$

$$\phi_{2i} = \angle(V_{2i}), \quad \phi_{3i} = \angle(V_{3i})$$

In this example, with 12 angles, the beamforming module 132 may regenerate V as a 3×3 matrix per tone. With 4-bits for expression for the angles, a 54 tone signal may have feedback information of 324 bytes (e.g., 4×12×54/8).

For a 4×4 MIMO communication, the beamforming unitary matrix may be:

$$V = (V)ij$$

$$= \begin{bmatrix} \cos\psi_1\cos\varphi_1 & \cos\psi_2\cos\varphi_2 & \cos\psi_3\cos\varphi_3 & \cos\psi_4\cos\varphi_4 \\ \cos\psi_1\sin\varphi_1 e^{j\phi_{11}} & \cos\psi_2\sin\varphi_2 e^{j\phi_{12}} & \cos\psi_3\sin\varphi_3 e^{j\phi_{13}} & \cos\psi_4\sin\varphi_4 e^{j\phi_{14}} \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} & \sin\psi_4\cos\theta_4 e^{j\phi_{24}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} & \sin\psi_4\sin\theta_4 e^{j\phi_{34}} \end{bmatrix}$$

$=[\cos(\psi_1)\cos(\psi_2); \sin(\psi_1)*e^{j\Phi_1} \sin(\psi_2)*e^{j\Phi_2}]$, where i, j=1, 2, 3, 4; wherein $\psi_1$, $\psi_2$, $\psi_3$, $\psi_4$, $\theta_1$, $\theta_2$, $\theta_3$, $\theta_4$, $\phi_1$, $\phi_2$, $\phi_3$, $\phi_4$, $\Phi_{21}$, $\Phi_{22}$, $\Phi_{23}$, $\Phi_{24}$, $\Phi_{31}$, $\Phi_{32}$, $\Phi_{33}$, $\Phi_{33}$, $\Phi_{41}$, $\Phi_{42}$, $\Phi_{43}$, $\Phi_{43}$ represent angles of the unit circle, wherein Diagonal (V*V)= 1s, and wherein:

$$\psi_i = \cos^{-1}\left(\sqrt{|V_{1i}|^2 + |V_{2i}|^2}\right),$$

$$\varphi_i = \cos^{-1}\left(\frac{V_{1i}}{\cos\psi_i}\right),$$

$$\theta_i = \cos^{-1}\left|\frac{V_{3i}}{\sin\psi_i}\right|,$$

$$\phi_{1i} = \angle(V_{2i}),$$

$$\phi_{2i} = \angle(V_{3i}),$$

$$\phi_{3i} = \angle(V_{4i})$$

In this example, with 24 angles, the beamforming module 132 may regenerate V as a 4×4 matrix per tone. With 4-bits for expression for the angles, a 54 tone signal may have feedback information of 648 bytes (e.g., 4×24×54/8).

The baseband transmit processing 100-TX receives the polar coordinates $\Phi$ and $\psi$ from the receiver as feedback information as will described in greater detail with reference to FIG. 6.

Figure 5:
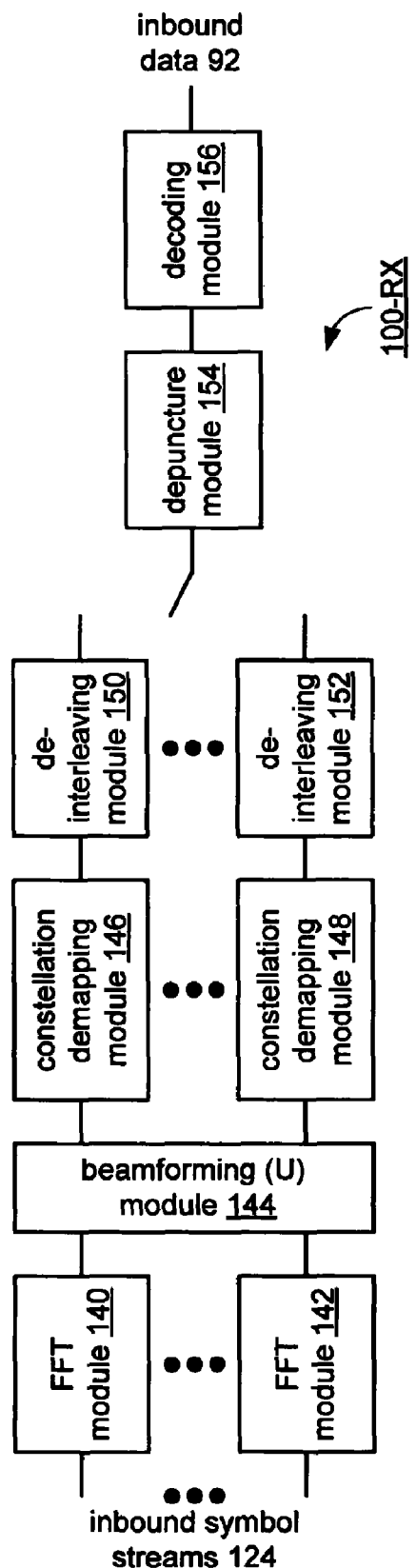
FIG. 5 is a schematic block diagram of baseband receive processing in accordance with the present invention.

FIG. 5 is a schematic block diagram of baseband receive processing block of baseband processing module 100 (100-RX) that includes a plurality of fast Fourier transform (FFT) modules 140, 142, a beamforming (U) module 144, a plurality of constellation demapping modules 146, 148, a plurality of deinterleaving modules 150, 152, a switch, a depuncture module 154, and a decoding module 156 for converting a plurality of inbound symbol streams 124 into inbound data 92. As one of ordinary skill in the art will appreciate, the baseband receive processing block 100-RX may include two or more of each of the deinterleaving modules 150, 152, the constellation demapping modules 146, 148, and the FFT modules 140, 142. In addition, one of ordinary skill in art will further appreciate that the decoding module 156, depuncture module 154, the deinterleaving modules 150, 152, the constellation decoding modules 146, 148, and the FFT modules 140, 142 may be function in accordance with one or more wireless communication standards including, but not limited to, IEEE 802.11a, b, g, n.

In one embodiment, a plurality of FFT modules 140, 142 is operably coupled to convert a plurality of inbound symbol streams 124 into a plurality of streams of beamformed symbols. The inverse beamforming module 144 is operably coupled to inverse beamform, using a unitary matrix having polar coordinates, the plurality of streams of beamformed symbols into a plurality of streams of data symbols. The plurality of constellation demapping modules is operably coupled to demap the plurality of streams of data symbols into a plurality of interleaved streams of data. The plurality of deinterleaving modules is operably coupled to deinterleave the plurality of interleaved streams of data into encoded data.

The decoding module is operably coupled to convert the encoded data into inbound data 92.

The beamforming module 144 is operably coupled to multiply a beamforming unitary matrix (U) with baseband signals provided by the plurality of FFT modules 140, 142. The FFT modules 140, 142 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. The baseband receive processing 100-RX is further functional to produce feedback information for the transmitter as further described with reference to FIG. 6. Further, the 100-RX block of FIG. 5 is operable to receive, decode and process any feedback information received from a remote device such as feedback 160 shown below in relation to FIG. 6.

Figure 6:
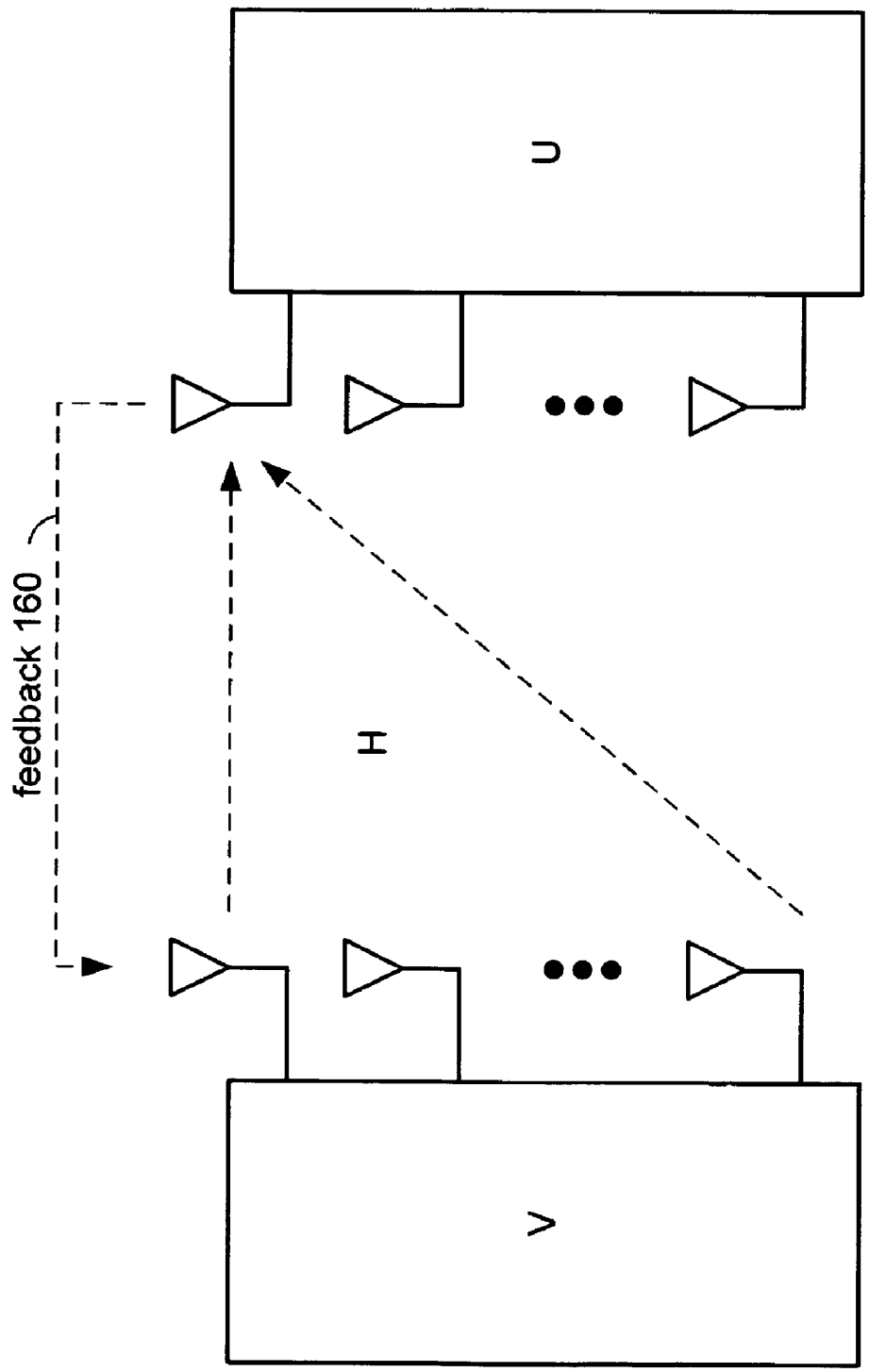
FIG. 6 is a schematic block diagram of a beamforming wireless communication in accordance with the present invention.

FIG. 6 is a schematic block diagram of a beamforming wireless communication where H=UDV* (H—represents the channel, U is the receiver beamforming unitary matrix, and V* is the conjugate of the transmitter beamforming unitary matrix. With H=UDV*, y (the received signal)=Hx+N, where x represents the transmitted signals and N represents noise. If z=Vx, then U*y=U*UDV*VZ+U*n=Dz+N.

From this expression, the baseband receive processing 100-RX may readily determine the feedback 160 of V, where V includes polar coordinates. For instance, the receiver may decompose the channel using singular value decomposition (SVD) and send information relating only to a calculated value of the transmitter's beamforming matrix (V) as the feedback information. In this approach, the receiver calculates (V) based on H=UDV*, where H is the channel response, D is a diagonal matrix, and U is a receiver unitary matrix. This approach reduces the size of the feedback information with respect to SVD using Cartesian coordinates. For example, in a 2×2 MIMO wireless communication, the feedback 160 includes four elements that are all complex values [V11 V12; V21 V22] with two angles ($\psi$ and $\Phi$).

In general, $Vik=aik+j*bik$, where aik and bik are values between [−1, 1]. To cover [−1, 1], $\psi$ is in [0, $\pi$] and $\Phi$ is in [0, $2\pi$]. With $\pi/2$ resolutions for angles, $\psi$ needs to be $\pi/4$ or $3\pi/4$, i.e., $\cos(\psi)=0.707$ or $-0.707$, which requires 1 bit, where $\Phi$ needs to be either $\pi/4$, $3\pi/4$, $5\pi/4$, $7\pi/4$, i.e., $\exp(j\Phi)=0.707(1+j)$, $0.707(1-j)$, $0.707(-1+j)$ or $0.707(-i-j)$, which requires 2 bits. With $\pi/4$ resolutions for angles, $\psi$ needs to be $\pi/8$, $3\pi/8$, $5\pi/8$, or $7\pi/8$, which requires 2 bits, where $\Phi$ needs to be either $\pi/8$, $3\pi/8$, $5\pi/8$, $7\pi/8$, $9\pi/8$, $11\pi/8$, $13\pi/8$ or $15\pi/8$, which requires 4 bits. So, for an example of 2×2 system operable to use 4 bits per tone, the feedback may have 1 bit for $\psi$, 2 bits for $\Phi$ and 1 index bit to determine the relationship between $\psi$ and $\Phi$, such as either $\psi1=\psi2+\pi$ and $\Phi1+\Phi2=\pi/2$, or $\psi1=\psi2$ and $\Phi1-\Phi2=\pi/2$.

For the same resolution in Cartesian expression of 4 bits per each element for each of the real and imaginary components, aik and bik, can be within [−½, ½], a feedback signal requires 4*2*4=32 bits per tone. For OFDM MIMO wireless communications, the number of bits required is 1728 bits for the Cartesian expression. While an angle expression in accordance with the present invention requires 8 bits per tone, which for the same OFDM MIMO wireless communications would require 432 bits. This represents a significant reduction in the overhead needed for packet exchange.

Figure 7:
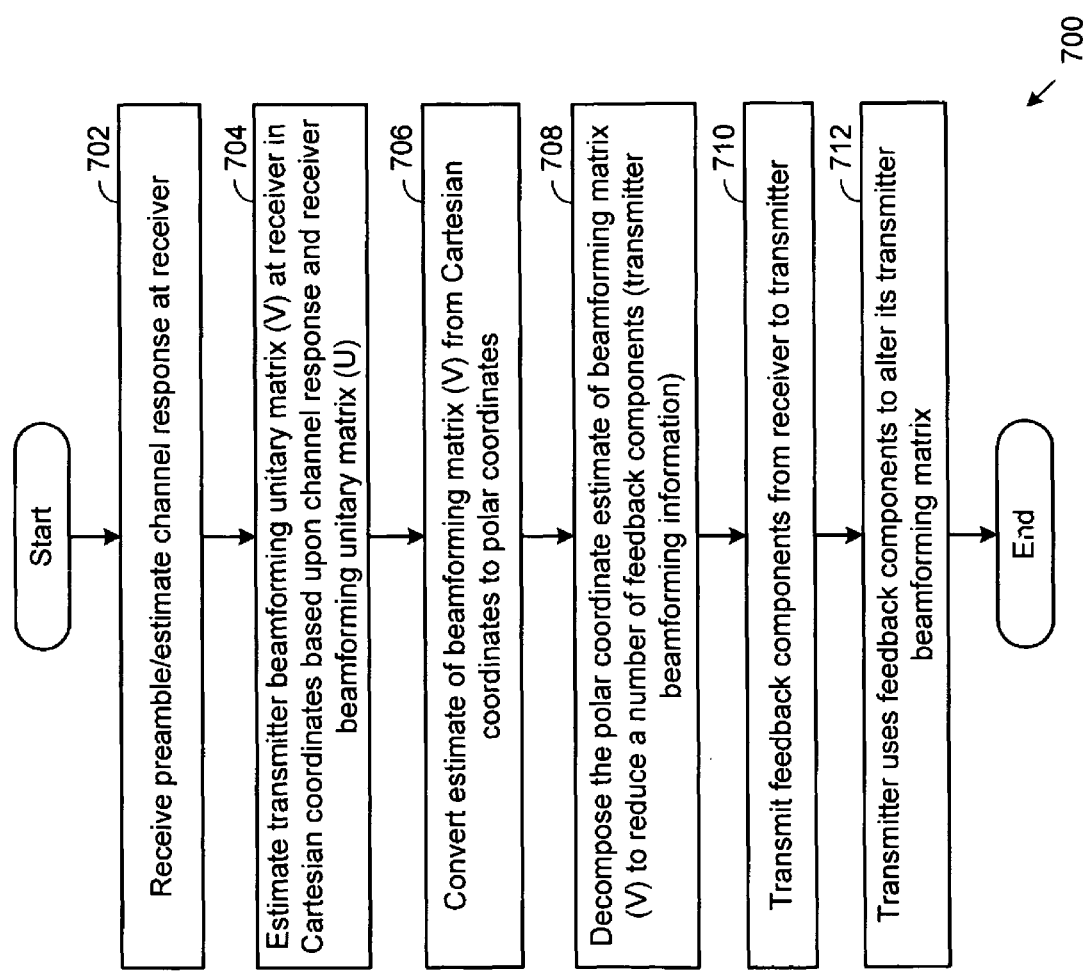
FIG. 7 is a flow chart illustrating another embodiment of the present invention for providing beamforming feedback information from a receiver to a transmitter.

FIG. 7 is a flow chart illustrating another embodiment of the present invention for providing beamforming feedback information from a receiver to a transmitter. The method 700 in particular addresses the feedback of observed transmitter beamforming information from a receiving wireless communication device to a transmitting wireless communication device. The embodiment of the method 700 of FIG. 7 relates to MIMO wireless communication systems, among others. Most of the operations of FIG. 7 are typically performed by a baseband processing module, e.g., 100 of FIG. 3 of a receiving wireless device.

The embodiment of method 700 commences with the receiving wireless communication device receiving a preamble sequence from the transmitting wireless device and estimating a channel response from the preamble sequence (step 702). Estimating the channel response includes comparing received training symbols of the preamble to corresponding expected training symbols using any of a number of techniques that are known in the art. The receiving wireless device then determines an estimated transmitter beamforming unitary matrix (V) based upon the channel response and a known receiver beamforming unitary matrix (U) (step 704). The channel response (H), estimated transmitter beamforming unitary matrix (V), and the known receiver beamforming unitary matrix (U) are related by the equation H=UDV*, where, D is a diagonal matrix. Singular Value Decomposition (SVD) operations may be employed to produce the estimated transmitter beamforming unitary matrix (V) according to this equation.

According to the embodiment of FIG. 7, the receiving wireless device produces the estimated transmitter beamforming unitary matrix (V) in Cartesian coordinates and then converts the estimated transmitter beamforming unitary matrix (V) to polar coordinates (step 706). With the estimated transmitter beamforming unitary matrix (V) determined, the receiving wireless device then decomposes the estimated transmitter beamforming unitary matrix (V) to produce the transmitter beamforming information (step 708).

According to one embodiment of this operation, the decomposition operations of step 708 employ a Givens Rotation operation. The Givens Rotation relies upon the observation that, with the condition of V*V=VV*=I, some of angles of the Givens Rotation are redundant. With a decomposed matrix form for the estimated transmitter beamforming matrix (V), the set of angles fed back to the transmitting wireless device are reduced.

Operation continues with the receiving wireless device wirelessly sending the transmitter beamforming information to the transmitting wireless device (step 710). This operation occurs with the receiving wireless device shifting to a transmit mode and sending the information back to the transmitting wireless device. The transmitting wireless device then uses the feedback components to generate a new beamforming matrix (V), which it uses for subsequent transmissions (step 712).

Figure 8:
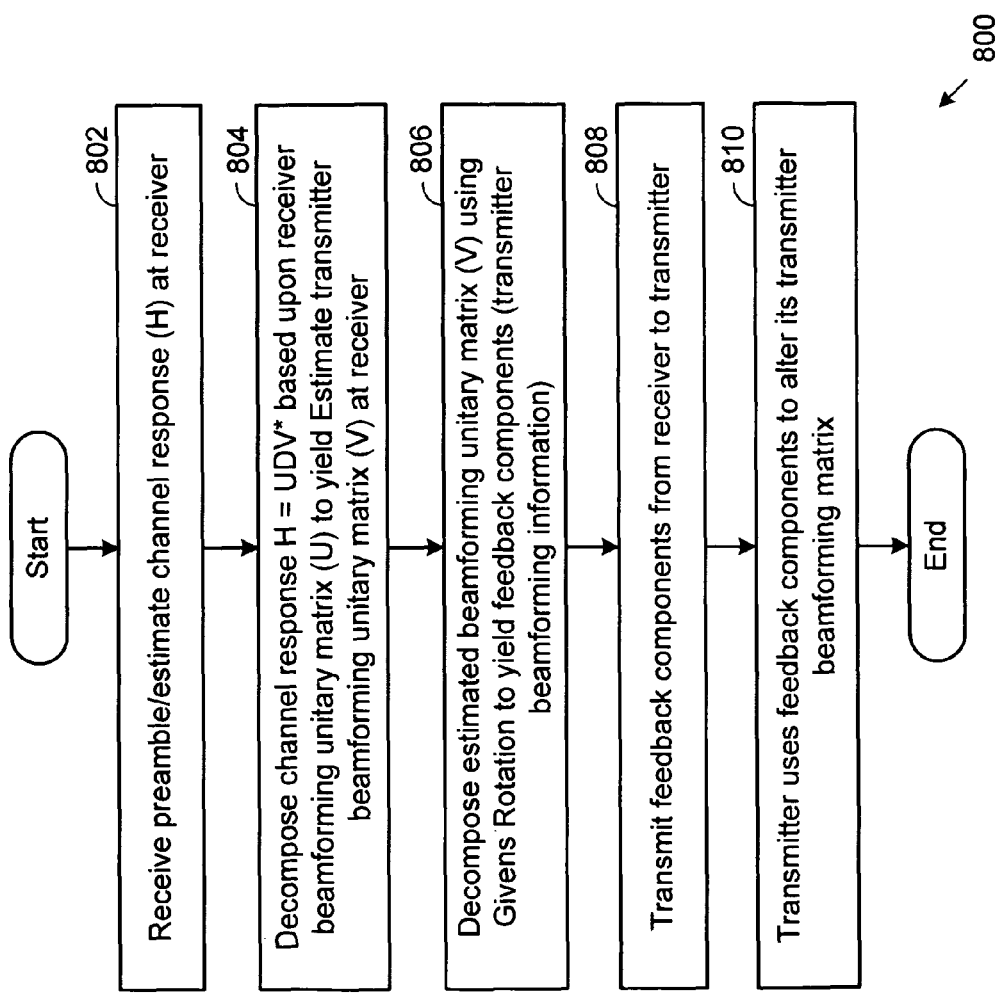
FIG. 8 is a flow chart illustrating another embodiment of the present invention for providing beamforming feedback information from a receiver to a transmitter.

FIG. 8 is a flow chart illustrating another embodiment of the present invention for providing beamforming feedback information from a receiver to a transmitter. The operations 800 of FIG. 8 are similar to the operations 700 of FIG. 7 and would typically be performed by a baseband processing module, e.g., 100 of FIG. 3 of a receiving wireless device.

The method 800 commences with the receiving wireless communication device receiving a preamble sequence from the transmitting wireless device and estimating a channel response (H) from the preamble sequence (step 802). Techniques similar/same as those described with reference to step 702 of FIG. 7 may be employed.

The receiving wireless device then decomposes the channel response (H) based upon the receiver beamforming unitary matrix (U) to produce an estimated transmitter beamforming unitary matrix (V) (step 804). With the estimated transmitter beamforming unitary matrix (V) determined, the receiving wireless device then decomposes the estimated transmitter beamforming unitary matrix (V) using a Givens Rotation to produce the transmitter beamforming information (step 806). The products of this Givens Rotation are the transmitter beamforming information.

Operation continues with the receiving wireless device wirelessly sending the transmitter beamforming information to the transmitting wireless device (step 808). This operation occurs with the receiving wireless device shifting to a transmit mode and sending the transmitter beamforming information to the transmitting wireless device. The transmitting wireless device then uses the feedback components to generate a new beamforming matrix (V), which it uses for subsequent transmissions (step 810).

One example of a Givens Rotation matrix that may be used for the decomposition operations of step 806 (and step 708) is:

$$G_l(\psi) = \begin{bmatrix} I_{l-1} & 0 & 0 & 0 \\ 0 & \cos\psi & \sin\psi & 0 \\ 0 & -\sin\psi & \cos\psi & 0 \\ 0 & 0 & 0 & I_{N-l-1} \end{bmatrix}$$

With this form, the Givens Rotation matrix rotates M [I,j], [I,j] to make (i,j−1)th component zero, where M [I,j],[I,j] is 2×2 block matrix at ith, jth row and ith, jth column.

Applying the Givens Rotation to the 2×2 estimated transmitter beamforming matrix (V) described above, for a particular form of the Givens Rotation, $\psi$ in $[0, \pi/2]$, $\phi$ in $[-\pi, \pi]$ the 2×2 estimated transmitter beamforming matrix (V) can be rewritten as:

$$V = \begin{bmatrix} \cos\psi_1 & \cos(\frac{\pi}{2} - \psi_1) \\ \sin\psi_1 e^{j(\pi+\phi_2)} & \sin(\frac{\pi}{2} - \psi_1) e^{j\phi_2} \end{bmatrix}$$

$$= \begin{bmatrix} 1 & 0 \\ 0 & e^{j\phi} \end{bmatrix} \begin{bmatrix} \cos\psi & \sin\psi \\ -\sin\psi & \cos\psi \end{bmatrix}$$

With angle resolution of $\pi/2^a$, where a=# of bits per angle, the total number of bits per tone is (a−1)+(a+1)=2a. With the 2×2 estimated transmitter beamforming matrix (V), $\psi$ needs (a−1) bits to cover $[0, \pi/2]$ and $\phi$ needs (a+1) bits to cover $[-\pi, \pi]$. With this notation: 'a=1' means quantized angle is either $[\pi/4, 3\pi/4]$ to cover $[0, \pi]$ with angle resolution of $\pi/2$; and 'a=2' means quantized angle is either $[\pi/8, 3\pi/8, 5\pi/8, 7\pi/8]$ to cover $[0, \pi]$ with angle resolution of $\pi/4$.

By using all combinations of the Givens Rotation, these concepts may be extended to an N×M matrix. Because the Givens Rotation needs real values, a phase matrix Di is applied before the Givens Rotation to yield:

$$V = \prod_{i=1}^{M} \left\{ D_i(1_{i-1} \quad e^{j\phi_{ii}} \quad \ldots \quad e^{j\phi_{iN}}) \prod_{j=i}^{N-1} G_j(\psi_{i,j}) \right\} \times \tilde{I}_{N \times M}$$

Where:
$D_i$ is an N×N diagonal matrix with diagonal components in arguments.
$I_{N \times M}$ is an N×M identity matrix, where $(I)_{ii}=1$ for i=1, ..., min(M,N).

As the reader will appreciate, the coefficients of the Givens Rotation and the phase matrix coefficients serve as the transmitter beamforming information that is sent from the receiving wireless communication device to the transmitting wireless communication device. For a 3×3 estimated transmitter beamforming matrix (V), from Givens Rotation, six angles in total ($\phi_{22}, \phi_{23}, \phi_{33}, \psi_{12}, \psi_{13}, \psi_{23}$) are required. With angle resolution of $\pi/2^a$, where a=# of bits per angle, the total number of bits per tone is 3(a−1)+3(a+1)=6a. In such case, $\psi$ needs (a−1) bits to cover $[0, \pi/2]$ and +needs (a+1) bits to cover $[-\pi, \pi]$. Using this polar coordinates embodiment, 24 bits per sub carrier are required to achieve equivalent full resolution performance to a Cartesian coordinates solution, which requires 72 bits per sub carrier.

For a 4×4 estimated transmitter beamforming matrix (V), from Givens Rotation, twelve angles in total ($\phi_{22}, \phi_{23}, \phi_{24}, \phi_{33}, \phi_{34}, \phi_{44}, \psi_{12}, \psi_{13}, \psi_{23}, \psi_{23}, \psi_{24}, \psi_{33}$) are required. With angle resolution of $\pi/2^a$, where a=# of bits per angle, the total number of bits per tone is 6(a−1)+6(a+1)=12a. In such case, $\psi$ needs (a−1) bits to cover $[0, \pi/2]$ and $\phi$ needs (a+1) bits to cover $[-\pi, \pi]$. Using this polar coordinates embodiment, 48 bits per sub carrier are required to achieve equivalent full resolution performance to a Cartesian coordinates solution, which requires 128 bits per sub carrier.

Using these techniques, for a simple case of 2×2 system with 20 MHz BW, the feedback of transmitter beamforming information requires 10*52/8=65 bytes. For the worst case of 4×4 system with 40 MHz BW (108 tones), the feedback requires 48*108/8=648 bytes. Efficiencies can be further obtained by using the correlation property of adjacent tones. (e.g., sending one information per every three tones). However, with a slowly fading channel, frequent channel feedback is not required.

Referring again to the discussion of the method for transmitting and receiving feedback either through an explicit or implicit feedback scheme, certain communications are required so that the transmitter and receiver operate in a compatible manner. As such, the embodiments of the invention contemplate optional transmit beamforming. Moreover, there is a need for the transmitter to be aware of the capabilities of the receiving station. Thus, the feedback signal specifies whether the receiver can support transmit beamforming. Generally, the described embodiments relate to two basic approaches. In a first approach, existing signal formats are modified to provide necessary feedback. In a second approach, a new signal is defined to provide desired feedback information.

Figure 9:
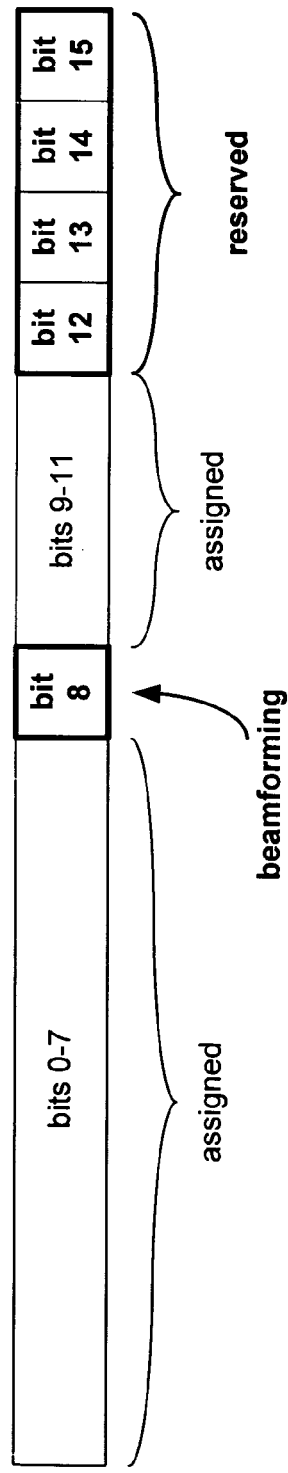
FIG. 9 illustrates a signal layout of one embodiment of the invention.

FIG. 9 is an illustration of signal bit assignments according to EWC 6.2.1.1 that may be redefined for use in one embodiment of the invention. Generally, the bit assignments for bits 8 and 12-15 are reassigned for one embodiment of the invention for the first of the two basic approaches as will be described in greater detail below. In the described embodiment of the first approach, the capabilities of the receive station are specified in a Capabilities Field by expanding present definitions of the HT-Capabilities Field as defined in 802.11(n) standards. By providing a method for a receive station to indicate what capabilities that station has, the transmitter is able to adjust forward link transmissions in an according manner. In one embodiment, the capabilities are specified through specified codes in existing HT-Capabilities fields.

With respect to the HT-Capabilities fields, only 5 bits are available in HT-Capabilities Info field (See 6.2.1.1 of EWC). B8 is for "Beamforming" and B12-15 are "Reserved". To implement transmit beamforming and corresponding feedback as described herein, the following capabilities are included in a feedback signal in the described embodiment of the invention:

An indication that the transmitter and receiver are capable of determining Channel Estimates and to provide Channel Feedback;

An indication that the receiving station is able to receive sounding frame with N_ltf>N streams (e.g. 4×2), and to compute channel estimate and send it in a feedback frame;

For embodiments that employ a Channel Estimate/V-Matrix Feedback Capability, the feedback includes an indication that receiving station is operable to receive sounding frame with N_ltf>N streams (e.g. 4×2). Thus, the receiving station is operable to compute singular value decomposition (SVD) for transmit (or transmitter) beamforming (TxBf) matrix V and to send the matrix in a feedback frame. SVD, as is known by one of average skill in the art, includes a technique for breaking a matrix into three matrices including the aforementioned V matrix. N_ltf is the number of long training fields which are required to fully estimate a channel while N is the number of streams.

Further, the transmitters of the described embodiments are operable to calibrate the forward link transmissions based upon the received feedback (ie., they are "Calibration Capable"). Specifically, the transmit station are operable to receive a matrix of calibration coefficients and to apply them to subsequent forward link transmissions. Finally, the transmit stations are capable to receive and process frames transmitted with beam forming in the described embodiment.

In view of the above, there are two approaches, as mentioned above, that are implemented in embodiments of the invention. In a first embodiment, an existing HT-Capabilities field is utilized with modifications. Effectively, existing reserved locations are redefined as follows to allow the device transmitting the HT-Capabilities Field to specify the following:

Bit 8 is defined to include a signal Receive TxBf Capable to indicate that the station can receive beamformed signals and can also transmit beamformed signals;

Bit 12 is defined to include a signal Channel Estimate/Channel Feedback Capable to indicate that the station can generate and transmit channel estimates in a matrix form as described herein;

Bit 13 is defined to include a signal Channel Estimate/V-Matrix Feedback Capable to indicate that the station can generate channel estimates and can transmit reduced format channel estimates using V-Matrix channel estimate descriptions;

B14 is defined to include a signal TX Calibration Capable to indicate that the transmitter of the station is capable of receiving channel estimates and calibrating the transmit signal parameters in a corresponding manner. For example, if a forward link transmitter generates this signal to a receive station, then the forward link transmitter indicates that it can beam form in a manner that is calibrated in response to a received channel estimate (in matrix form) from the receive station. While the above approach is utilized in one embodiment of the invention, an alternate embodiment defines a new signal format that avoids some of the drawbacks of the above described embodiment. For example, one drawback of the above approach is that there is only one bit left (bit 15) for growth to solve future problems. Thus, there would not be an easy way to signal new capabilities if improvements are developed in the future.

Accordingly, a second embodiment of the invention includes adding a new field in the element definition field to provide a flexible solution. Specifically, the second embodiment includes an element definition block that is flexible (selectable) in length to provide for future extensions to the capability information element (Capability IE). Among other changes, an element ID value is changed from 51 to a three digit value XXX which is vendor specific. Additionally an OUI vendor ID is provided as a means for at least partially solving interoperability issues that are likely to develop.

Figure 10:
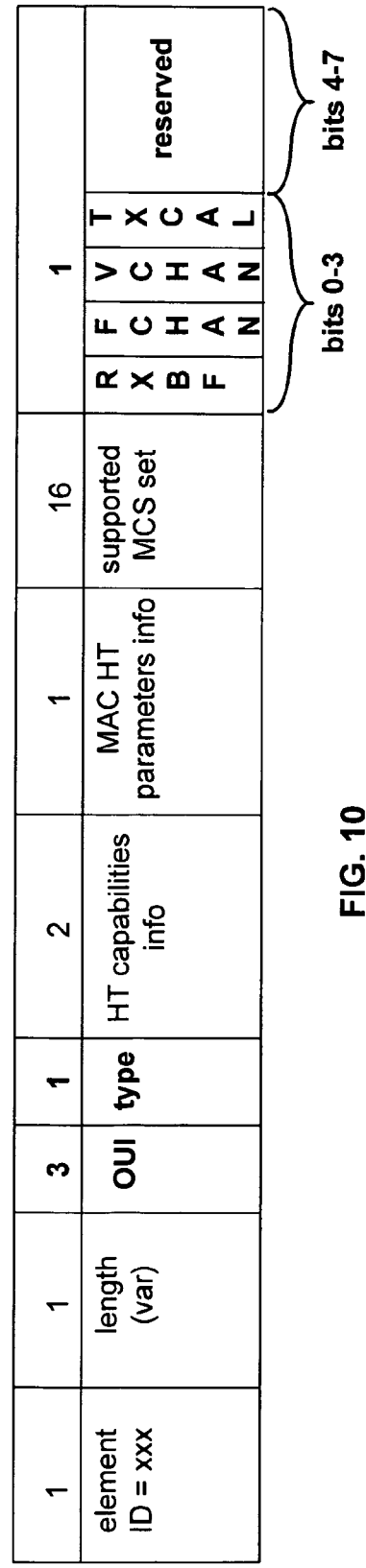
FIG. 10 is a signal diagram that illustrates a Signal Field Physical Frame Format according to one embodiment of the invention.

FIG. 10 illustrates a signal layout of one embodiment of the invention that utilizes a newly defined signal. Specifically, starting from left to right, an Element ID is defined that is three digits long. The element ID is followed by a variable length definition field that defines a length of the frame. Thereafter, the vendor ID labeled as OUI follows. The general format for the field is OUI=0xAA-BB-CC (Vendor specific) to provide a vendor specific ID. Thereafter, a type field having the format of TYPE=0x1 is provided to identify an HT capability element (extendable) to distinguish from other types of elements (non-extendable). Other types may be defined in the future as necessary.

The following three elements, namely the high throughput (HT) capabilities information element, the medium access layer (MAC) HT parameters information element, and the supported modulation and coding set (MCS) set element are existing elements and are implemented as defined in 802.11. The MCS facilitates describing the method used for modulating data and for specifying the data rate for a MIMO system in which there may be multiple ways of encoding with various data rates. Generally, the MCS defines the operational transmission mode of the communication link. The HT capabilities information is used by an access point to determine transmission parameters based on wireless device capability.

Finally, a Beamforming element is defined to define a space for four bits to indicate RX Beamforming (Bit 0), Full Channel Estimate (Bit 1) to indicate that a full matrix is being generated and transmitted, V Channel Estimate (Bit 2) to indicate that a reduced channel estimate matrix is being transmitted (as described herein) and a TX Cal (Bit 3) to indicate that the station is capable of calibrating the beamforming based upon a received channel estimate in a full or reduced matrix format. These described fields are illustrated in bold.

FIG. 11 is similar to FIG. 10 and illustrates an alternate embodiment of the invention. In FIG. 11, signals are included that provided for staggered sounding. Sounding generally refers to the transmission of a sounding frame from one or more antennas to allow a receiver to calibrate the radio channel(s). Generally, each spatial stream from each antenna in a MIMO sounding transmission is transmitted with the same power and same coding scheme. For staggered sounding, sounding signals are not necessarily transmitted from each antenna with the same data stream at the same time. For example, in one embodiment, staggered sounding includes transmitting a data stream first and then transmitting additional streams with training symbols (the streams are staggered). In an alternate embodiment, all antennas transmit at the same time the do not transmit the same data stream at the same time.

A staggered sounding frame in a MIMO application relates to the relative transmission of long training sequence frames (sounding frames) across the various antennas. Specifically, staggered sounding relates to transmission of sounding frames of only a subset of all operational antennas at a given time. Non-staggered involves transmitting the sounding frames on all antennas at once. Accordingly, in the described embodiment of the invention, the transmitting station indicates in the HT-SIG field whether staggered or non-staggered sounding is being used. Effectively, this signaling allows a transmit and a receive station to operatively determine whether to utilize staggered or non-staggered channel sounding.

FIG. 12 is another alternate embodiment of the invention in which the first bit is defined to carry the ETXBF signal to indicate the field has an expandable length and bits 1-7 are reserved for prior defined or other definitions. Generally, FIG. 12 illustrates that a single bit field may be defined that enables a device to specify whether the remaining field is to be expanded to define beam forming capabilities.

Figure 13:
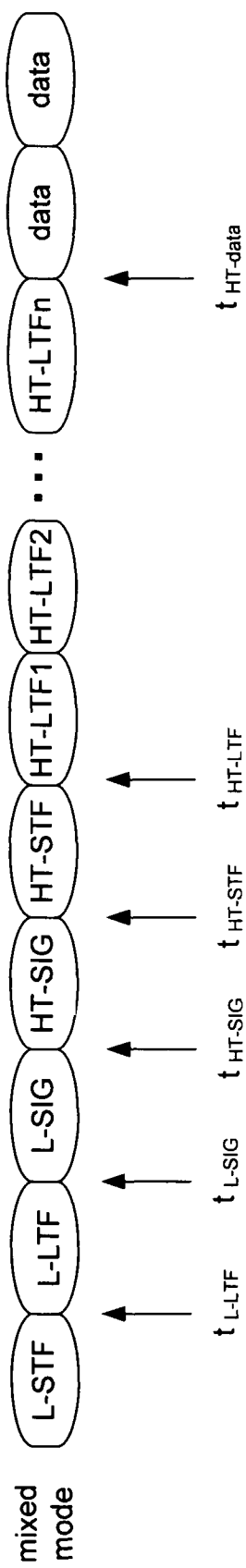

FIG. 13 is a signal diagram that illustrates a Signal Field Physical Frame Format according to one embodiment of the invention. In the described embodiments of the invention, Sounding Frames are used to enable RX stations to compute full MIMO channel estimates and for calibration purposes to support channel feedback. The Sounding Frames are transmitted for Mixed Mode transmissions and not for Greenfield transmissions. Thus, the Sounding Frames are not used with legacy or non-beamforming capable stations. In FIG. 10, as shown, an PHY HT-SIG Field included and in the described embodiment, is used to indicate what modulation coding set (MCS) number 0-7 is to be used. In the described embodiment, only one stream is used. The field is further used to indicate a number of TX antennas being used. Generally, the number of HT−LTF>=Nstreams (number of streams) in the MCS. In the described embodiments of the invention, the TX station is operable to provide either staggered or non-staggered Sounding Frames. Accordingly, in the Capabilities signaling, the station (e.g., the receive station) indicates whether it is staggered or non-staggered sounding capable.

With respect to the payload encoding that follows the long training frames, the payload is only 22 bytes long though multiple training signals are provided. The payload is provided on one stream only. Examples of embodiments or options include mapping a single stream to antenna 1, mapping a single stream to multiple TX antennas via a fixed spatial spreading map, and finally re-using mapping from 3.6.1 of the EWC Working Group specification.

In one embodiment, the number of long training frames utilized is equal to number of TX antennas. In an alternate embodiment, the same rule is used with one exception. If three antennas are used, four long training frames are used.

For a single stream of data, RX will compute m×n MIMO channel estimate Hest for "m" RX antennas and "n" Tx antennas. The receiver, however, must know how single stream data for payload is encoded. In the described embodiment, all TX antennas for are employed for a single stream. Thus, the single stream is sent with cyclic shifts to across antennas. The following cyclic shifts are employed:

Antenna 1 0 ns
Antenna 2 −400 ns
Antenna 3 −200 ns (if employed)
Antenna 4 −600 ns (if employed)

These shifts are the same as cyclic shifts as HT preamble. Thus, this embodiment makes it easy to compute entire channel for single stream.

Sounding Frame MAC Format

A New SUBTYPE of CONTROL TYPE is employed at the MAC layer as follows:

| Octets: 2 | | | | | |
|---|---|---|---|---|---|
| 2 | 6 | 6 | 1 | 1 | 4 |
| Frame Control | Duration | RA | TA | Calibration Control | Calibration Sequence | FCS |

As may be seen, the payload is 22 bytes in total length.

Full Channel Feedback Frames

The Full Channel Feedback frames are not clearly defined in TGnsync. The WWiSE working group used an action frame for MIMO Channel Response that provides for 16 bits each for I&Q per subcarrier. Thus, the number of bits provided are not adequate. 8 bits each are needed for I&Q per subcarrier per MIMO matrix element for reasonable performance. For example, for a 2×2H matrix, 64 bits per subcarrier are required. In a worst case of a 4×4H matrix, 256 bits (32 bytes) per subcarrier are required.

Thus, the following feedback frame format is employed in one embodiment of the invention:

Feedback Frame Format

| Octets: 1 | | | | | |
|---|---|---|---|---|---|
| 1 | 2 | 1 | 1 | 1 | N |
| Category | Element ID | Length | Type | Sequence | Order | Data |

The Category, Element ID and Length are as defined in 802.11(e) standard as known by one of average skill in the art. The type as defined herein is assigned the following definitions: Type: 0=Full Feedback, 1=Compressed V Feedback, 2-255=reserved. With respect to the Sequence; each complete channel has a unique sequence number. This is incremented between measurements. The Order allows breaking up measurements into multiple frames and defines a parameter for combining broken frames into the correct order for processing. With respect to the Data field, the channel matrix elements indexed in order by i and q coefficient bits (LSB to MSB), row, column, and data subcarrier index as shown below, for e.g. 2×2, 20 MHz (52 data subcarriers)

DATA section has 2×2×2×52=416 octets of coefficients

| subcarrier = −26 | subcarrier = −26 | subcarrier = −26 | subcarrier = −26 | ☐☐☐ | subcarrier = +26 |
|---|---|---|---|---|---|
| $H_{11}$ I | $H_{11}$ Q | $H_{21}$ I | $H_{21}$ Q | | $H_{22}$ Q |

The blocks of the data represent the real and complex portions of the channel description since the channel descriptions are real numbers.

Reduced Channel Feedback Frames

In one embodiment of the invention, a frame format for V matrices is defined as follows:

Generally, using the unitary property of V, the overhead can be reduced. 3 to 4 bits per parameter are necessary to achieve the performance close to ideal SVD beamforming. Thus, a 2×2 V matrix needs 8 bits per sub-carrier. A 3×3 V matrix needs 18 bits per sub-carrier. A 4×2 V matrix needs 22 bits per sub-carrier. Finally, a 4×4 V matrix needs 36 bits per sub-carrier. Thus, using a V matrix is preferable for bigger system, e.g., 4×4. In the described embodiment, the full channel feedback frame format is used to transmit the V matrix (with its reduced size). The style or type of feedback is indicated in the Type field as described elsewhere.

Rate/MCS Feedback Frames

TGnsync defined the Rate with LAC frames using either MCS feedback or by incorporating RTS/CTS. One problem with RTS/CTS, however, is that it is not backward compatible with .11a, .11b or .11g.

In the embodiment of the invention, HT control field concept is employed utilizing an extension to most existing frame TYPE/SUBTYPEs. Specifically, all Control subtypes, all Management subtypes, all QOS Data subtypes utilize an extension. To illustrate, an ORDER bit is used to indicate presence of HT_CONT field. The HT_CONT field contains MCS feedback request/response. Thus, the approach is very versatile and allows use in almost all handshake frame exchanges. Thus, for example, the HT Control field may be used to send rate feedback information from a receiving station to a transmitting station on a range of 802.11 frame types. The feedback may be appended on other frames for efficiency purposes instead of sending a new type of frame.

Feedback with HT Control Field

E.g. Control Type Frame:

| | | | | Octets: 2 | |
|---|---|---|---|---|---|
| 2 | 6 | 6 | 2 | | 4 |
| Frame Control | Duration | RA | RA | HT Control Field | FCS |

E.g. Mgmt Type Frame:

| | | | | | Octets: 2 | | |
|---|---|---|---|---|---|---|---|
| 2 | 6 | 6 | 6 | 2 | 2 | n | 4 |
| Frame Control | Duration | ADD1 | ADD2 | ADD3 | SEQ | HT Control Field | Payload FCS |

E.g. Data Type Frame, QOS Subtype:

| | | | | | | Octets: 2 | | | |
|---|---|---|---|---|---|---|---|---|---|
| 2 | 6 | 6 | 6 | 2 | 6 | 2 | 2 | N | 4 |
| Frame Control | Duration | ADD1 | ADD2 | ADD3 | SEQ | ADD4 | QOS | HT Control Field | Payload FCS |

An Order Bit is Set to Indicate Presence of HT Control Field

As one of average skill in the art will appreciate, other embodiments may be derived from the present teachings without deviating from the scope of the claims. While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

The preceding discussion has presented a programmable transmitter for generating frames of different formats according to different operating modes. As one of ordinary skill in the art will appreciate, other embodiments may be derived from the teachings of the present invention without deviating from the scope of the claims.

What is claimed is:

1. A radio transceiver, comprising:
a radio front end for communicating wirelessly with a transmitting device at a high throughput (HT) data rate, in which the radio front end receives a signal transmitted from the transmitting device, the wireless communicating comprising at least one of the transmitting device transmitting the signal over multiple antennas or the-radio front end receiving the signal over multiple antennas; and a baseband processing logic to process the signal received by the radio front end to estimate transmitter beamforming parameters and to generate feedback information to the transmitting device regarding capabilities of the radio transceiver, the feedback information to be provided in an expansion of an established frame required of a communication protocol signal used for feedback transmission to the transmitting device, wherein the feedback information is appended as an extended field to a selected field of the frame and the feedback information includes a first appended bit to indicate that the radio transceiver is capable of receiving and transmitting beamformed signals, a second appended bit to indicate that the radio transceiver is capable of generating and transmitting channel estimates in a matrix form, and a third appended bit to indicate that the radio transceiver is capable of generating channel estimates and transmitting reduced format channel estimates, in which the feedback information is transmitted back to the transmitting device for the transmitting device to alter subsequent forward link transmissions to the radio transceiver based on capabilities of the radio transceiver.

2. The radio transceiver of claim 1, wherein the frame includes a frame identification field, a HT capabilities field, a medium access layer HT parameters field, a supported modulation and coding set field, and a frame length field, in which the frame length field indicates additional length allocated to the frame to include the feedback information being sent in the feedback transmission.

3. The radio transceiver of claim 2, wherein the frame containing the feedback information further including a vendor field for specifying a specific vendor or vendor parameter.

4. The radio transceiver of claim 2, wherein the frame containing the feedback information further including a type field for specifying whether an HT element is present.

5. The radio transceiver of claim 2, wherein the selected field is the HT capabilities field.

6. The radio transceiver of claim 5, wherein the communication protocol designates the signal to utilize 802.11(n) communication protocol.

7. The radio transceiver of claim 5, wherein the extended field further including a sounding indicator field that is operable to signal a sounding frame.

8. The radio transceiver of claim 7, wherein the sounding indicator field is operable to signal sounding by specifying at least one of a frame not being a sounding frame, a frame having sounding with one or more transmit antenna, a frame having sounding with two or more transmit antennas, or a frame having sounding with three or more transmit antennas.

9. The radio transceiver of claim 7, wherein the extended field further including an indication that the radio transceiver is staggered sounding capable.

10. The radio transceiver of claim 7, wherein the extended field further including an indication that the radio transceiver is non-staggered sounding capable.

11. The radio transceiver of claim 2, wherein the feedback information to include a fourth appended bit to indicate that the radio transceiver is capable of calibrating beamforming based upon a received channel estimate in full or reduced matrix format.

12. A radio transceiver, comprising:
a radio front end for communicating wirelessly with a transmitting device, in which the radio front end receives a signal transmitted from the transmitting device, the wireless communicating comprising at least one of the transmitting device transmitting the signal over multiple antennas or the radio front end receiving the signal over multiple antenna; and a baseband processing logic to process the signal received by the radio front end to estimate transmitter beamforming parameters and to generate feedback information to the transmitting device regarding capabilities of the radio transceiver, the feedback information to be provided in an expansion of an established frame required of a 802.11(n) communication protocol signal used for feedback transmission to the transmitting device, wherein the feedback information is appended as an extended field to a high throughput (HT) capabilities field of the frame and the feedback information includes a first bit to indicate that the radio transceiver is capable of receiving and transmitting beamformed signals, a second bit to indicate that the radio transceiver is capable of generating and transmitting channel estimates in a matrix form, and a third bit to indicate that the radio transceiver is capable of generating channel estimates and transmitting reduced format channel estimates, in which the feedback information is transmitted back to the transmitting device for the transmitting device to alter subsequent forward link transmissions to the radio transceiver based on capabilities of the radio transceiver.

13. The radio transceiver of claim 12, wherein the feedback information to include a fourth bit to indicate that the radio transceiver is capable of calibrating beamforming based upon a received channel estimate in full or reduced matrix format.

14. The radio transceiver of claim 12, wherein the frame includes a frame identification field, the HT capabilities field, a medium access layer HT parameters field, a supported modulation and coding set field, and a frame length field, in which the frame length field indicates additional length allocated to the frame to include the feedback information being sent in the feedback transmission.

15. The radio transceiver of claim 12, wherein the frame containing the feedback information further including a vendor field for specifying a specific vendor or vendor parameter.

16. The radio transceiver of claim 12, wherein the frame containing the feedback information further including a type field for specifying whether an HT element is present.

17. The radio transceiver of claim 12, wherein the extended field further including a sounding indicator field that is operable to signal a sounding frame.

18. The radio transceiver of claim 17, wherein the sounding indicator field is operable to signal sounding by specifying at least one of a frame not being a sounding frame, a frame having sounding with one or more transmit antenna, a frame having sounding with two or more transmit antennas, or a frame having sounding with three or more transmit antennas.

19. The radio transceiver of claim 17, wherein the extended field further including an indication that the radio transceiver is staggered sounding capable.

20. The radio transceiver of claim 17, wherein the extended field further including an indication that the radio transceiver is non-staggered sounding capable.

* * * * *

UNITED STATES PATENT AND TRADEMARK OFFICE
CERTIFICATE OF CORRECTION

PATENT NO. : 8,345,732 B2  
APPLICATION NO. : 11/412388  
DATED : January 1, 2013  
INVENTOR(S) : Matthew J. Fischer et al.

It is certified that error appears in the above-identified patent and that said Letters Patent is hereby corrected as shown below:

Col. 4, line 19, in the Brief Description of the Several Views of the Drawings - after "Figure 10 is a signal diagram that illustrates a Signal Field Physical Frame Format according to one embodiment of the invention." insert:
--Figure 11 is a signal diagram that illustrates a Signal Field Physical Frame Format according to another embodiment of the invention.
Figure 12 is a signal diagram that illustrates a Signal Field Physical Frame Format according to still another embodiment of the invention.
Figure 13 is a signal diagram that illustrates a single stream sequence showing training fields followed by a payload for a Signal Field Physical Frame Format according to one embodiment of the invention.--

Signed and Sealed this  
Ninth Day of April, 2013

Teresa Stanek Rea  
*Acting Director of the United States Patent and Trademark Office*